United States Patent [19]

Borel

[11] Patent Number: 4,618,342
[45] Date of Patent: Oct. 21, 1986

[54] MACHINE FOR PROCESSING WEB MATERIAL

[75] Inventor: Edouard Borel, Corcelles-Chavornay, Switzerland

[73] Assignee: Bobst SA, Lausanne, Switzerland

[21] Appl. No.: 799,930

[22] Filed: Nov. 20, 1985

[30] Foreign Application Priority Data

Nov. 21, 1984 [CH] Switzerland .................. 05566/84

[51] Int. Cl.$^4$ .................. B31B 1/10; B31B 1/18; B31B 1/25
[52] U.S. Cl. .................. 493/30; 493/33; 493/60; 493/342; 493/361; 493/370; 493/477; 493/478
[58] Field of Search .................. 493/27, 30, 33, 60, 493/65, 82, 342, 354, 355, 361, 369, 370, 477, 478, 479

[56] References Cited

U.S. PATENT DOCUMENTS

| | | | |
|---|---|---|---|
| 1,764,358 | 6/1930 | Smith | 493/60 |
| 1,816,934 | 8/1931 | Roesen | 493/33 |
| 2,262,303 | 11/1941 | Staude | 493/60 |
| 2,515,863 | 7/1950 | Davidson | 493/60 |
| 3,926,097 | 12/1975 | Santa Maria et al. | 493/361 |
| 3,946,644 | 3/1976 | Feldkamper | 493/309 |
| 3,949,654 | 4/1976 | Stehlin | 493/370 |
| 4,176,833 | 12/1979 | Heimlicher | 493/476 |
| 4,540,394 | 9/1985 | Cavagna | 493/365 |

FOREIGN PATENT DOCUMENTS

929294  6/1963  United Kingdom .................. 493/60

Primary Examiner—Francis S. Husar
Assistant Examiner—William E. Terrell
Attorney, Agent, or Firm—Hill, Van Santen, Steadman & Simpson

[57] ABSTRACT

A machine including a feeding group or station, a first rotative cutting or creasing station, a second rotative cutting or creasing station and a rotative stripping station characterized by a single drive motor driving the various rotating tools of the stations and a feed roll of the feeding station. Each of the first and second stations and the stripping station have a frame with two lateral frame members with each of the lateral frame members having a groove for receiving bearing blocks for the upper and lower rotatable tools and one of the frame members of each groove mounts a drive pinion in a fixed position relative to the groove and in driving engagement with a gear on the shaft of the lower tool. Each of the bearing blocks have the same outer dimensions with the axis of the tool being positioned in the bearing block depending on the size of the tool so that by changing tools, the gears of the tools always engage the same drive pinion. To insure synchronization between the various groups or stations having rotatable tools, the motor drives the pinion for one station which pinion in turn is connected by a gear train to the adjacent rotatable tool station which in turn is connected by a gear train to the stripping station. In addition, the driven first pinion is connected by a drive train to a differential for driving the feed roll which differential receives a signal for correcting registration.

8 Claims, 9 Drawing Figures

FIG. 8

MACHINE FOR PROCESSING WEB MATERIAL

BACKGROUND OF THE INVENTION

The present invention is directed to a machine for processing web material, for instance, a web of cardboard, paper or synthetic material in order to manufacture blanks to be folded into boxes.

The processing of a cardboard web, for instance, to produce box blanks which are to be folded into boxes includes the steps of printing, cutting, creasing, as well as stripping of the waste cardboard and finally delivering the blanks in a piling-up station. A machine for processing web material in order to manufacture box blanks by using rotatable members or tools acting on the web are already known. The rotatable members are generally arranged in several successive stations, for example, in one of several printing stations, a creasing station, a cutting station and a stripping station. In addition, the tools of these successive stations are driven in a synchronized relationship. These rotating tools are usually preceded by a feeding station for feeding the web of material into the various rotating processing stations and is followed by a delivery station which delivers the manufactured box blanks. These machines are currently available and are well known in the art.

One difficulty with this type of machine is that the size of the box blank, which can be manufactured, is limited by the diameter of the various rotatable members or rolls in the cutting, creasing and stripping stations. The solution is then to change these rotatable members or rolls so that the diameter suits the desired size for the blank, but it practically requires a complete disassembly of the stations equipped with the rotatable members so that a change of the size of the rolls or members in the machine causes the machine to be out of production for quite some time.

Another difficulty occurs in the setting of the synchronization of the successive stations. So far, the angular phasing of the rotatable members or rolls of the various stations could only be achieved by their most accurate registering. To that aim, the driving members of the station had to be set with particular pinions acting like a differential. This solution is expensive because of the numerous parts which are required.

SUMMARY OF THE INVENTION

The present invention is directed to providing an improved machine for processing web material which machine has cutting, creasing and stripping stations and which machine allows a quick change of the size of the rotating members or rolls without complicated setting operations and with a reliable and cheap phasing of two successive stations.

To accomplish these goals, the invention is directed to an improvement in a machine for processing web material comprising a feeding station, a creasing station provided with rotatable tools, a cutting station with rotatable tools, a stripping station with rotatable tools, a delivery station and drive means for rotating the rotatable tools. The improvements are that each of the successive stations with rotatable tools includes a frame having two lateral frame members, each lateral frame member having a groove, a drive pinion of the drive means being mounted on one of the lateral frame members adjacent the groove, each of said grooves receiving a lower bearing block and an upper bearing block separated by a thickness plate for mounting an upper and lower rotatable tool with one of the tools having a pinion in driving engagement with the drive pinion of the station, said bearing blocks having identical outside shapes regardless of the size of the rotatable tool, locking means being provided on each of the frame members for providing a locking pressure to urge the upper and lower bearing blocks downwardly with the lower bearing blocks engaging the lower face of the groove, said locking means including jam-preventing means for releasing the locking pressure on the bearing blocks in response to a predetermined pressure being applied to the rotatable tool, and said drive means having a single drive motor directly connected through a shaft to a first drive pinion of one of said stations with rotatable tools, said first drive pinion being connected by a first drive train to a differential means having an output connected to a feed roll of the feed station, said differential means receiving an input from a correction motor in order to vary the rate of feed of the web to the stations having rotatable tools, said first pinion being connected by a second drive train including a angular phasing device to the drive pinion of the adjacent station, said adjacent station having brake means connected to a pinion acting on the gear of the lower rotatable tool and a third drive train connecting the pinion of the second station to the stripping station, said stripping station having an angular phase device for setting the phase between the upper and lower tool.

One of the features of the improvement are that the bearing blocks have the same outside dimension and the position of the axis of the tool in the block changes for tools having different diameters so that the gear attached to the tool always engages the drive pinion. Thus, the size of the tools can be easily changed by removing the old tools and bearing blocks and inserting the new size tool with the bearing blocks. Other advantages and objects of the present invention will be readily apparent from the following drawings and description of an exemplary embodiment.

DESCRIPTION OF THE PREFERRED EMBODIMENTS

Figure 1:
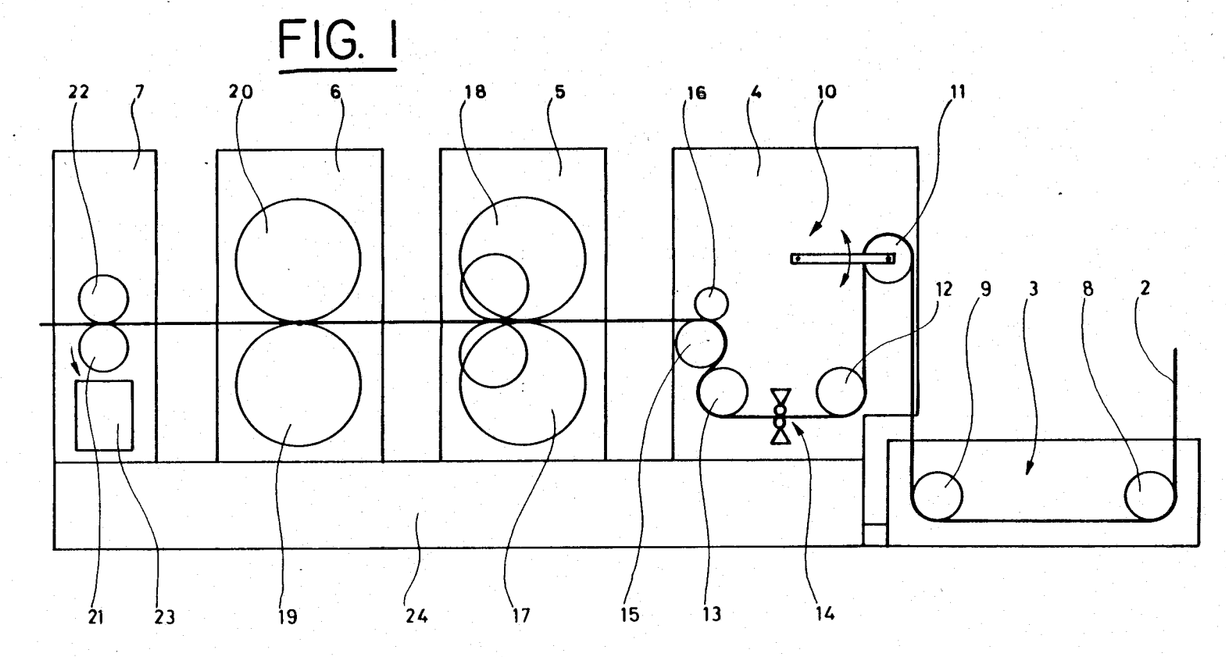
FIG. 1 is a schematic view of the machine in accordance with the present invention.

The principles of the present invention are particularly useful when incorporated in a machine schematically illustrated in FIG. 1. The machine of FIG. 1 is located after the printing station which is not shown and before the delivery station which is also not shown. The machine will process a web material 2 and cut it into a series of box blanks with the waste material being stripped therefrom. As illustrated, the machine includes a lateral web guiding group or station 3, a feeding group or station 4, a first cutting and/or creasing station 5 having a pair of rotatable tools, a second cutting and/or creasing group or station 6 and a stripping station 7.

The lateral web guide group or station 3 includes two cylindrical rolls 8 and 9 which act on the web 2 in order to change its lateral position if requested. The structure and operation of such a station or group is well known in the art of processing web materials in a continuous mode.

The feeding station or group 4 comprises an idler device 10 which has a transverse cylindrical roll 11 mounted for pivotal movement as indicated by the arrow. In addition, the web after passing over the cylindrical roller 11 goes to a first tensioning roll 12 through a straightening device 14 to a second tensioning roll 13. From the tensioning roll 13, the web moves to a feed cylinder or roll 15, which has a pressure roller 16 to hold the web thereagainst. This feed station 4 is provided with a device for correcting the length of registration errors acting on the feed cylinder so that it delivers the web length wanted for an accurate positioning of the cut with a print of the web. The structure of such a feed station is also well known in the art.

A first cutting and/or creasing station 5 includes rotatable tools such as rolls 17 and 18 which are arranged with their axes in a vertical plane. The rotatable tools 17 and 18 can be cutting rolls, creasing rolls, a combination of cutting and creasing rolls or a combination cutting, creasing and stripping rolls. With these various combinations of rolls, a very large number of different jobs are available and the best solution for any one type of job can be selected from one group or another. The second rotatable cutting and creasing group or station 6 is similar to the first group and has substantially the same structure and can receive the same types or combinations of tools.

In the chosen illustrated embodiment, the first cutting and creasing station 5 will be equipped with rotative creasing rolls whereas the second or adjacent station 6 is provided with rotative cutting rolls 19 and 20. The stripping group or station 7 is provided with a couple of stripping tools 21 and 22 which are located one above the other with their axes being on a common vertical axial plane. In addition, the stripping station has a waste-removal device 23.

If the rotating cutting machine is to be simplified, the stripping group 7 can be replaced by using cutting and stripping rolls in the second cutting station 6. A further simplification would be to remove the second cutting station 6 by using a combination of cutting, creasing and stripping rolls in the first station 5. However, both of these simplifications reduce the number of possible jobs that can be accepted by the machine.

Each of the stations 4, 5, 6 and 7 have frames which are mounted on a base 24 which is connected with the main frame of the machine for processing the web materials.

Figure 2:
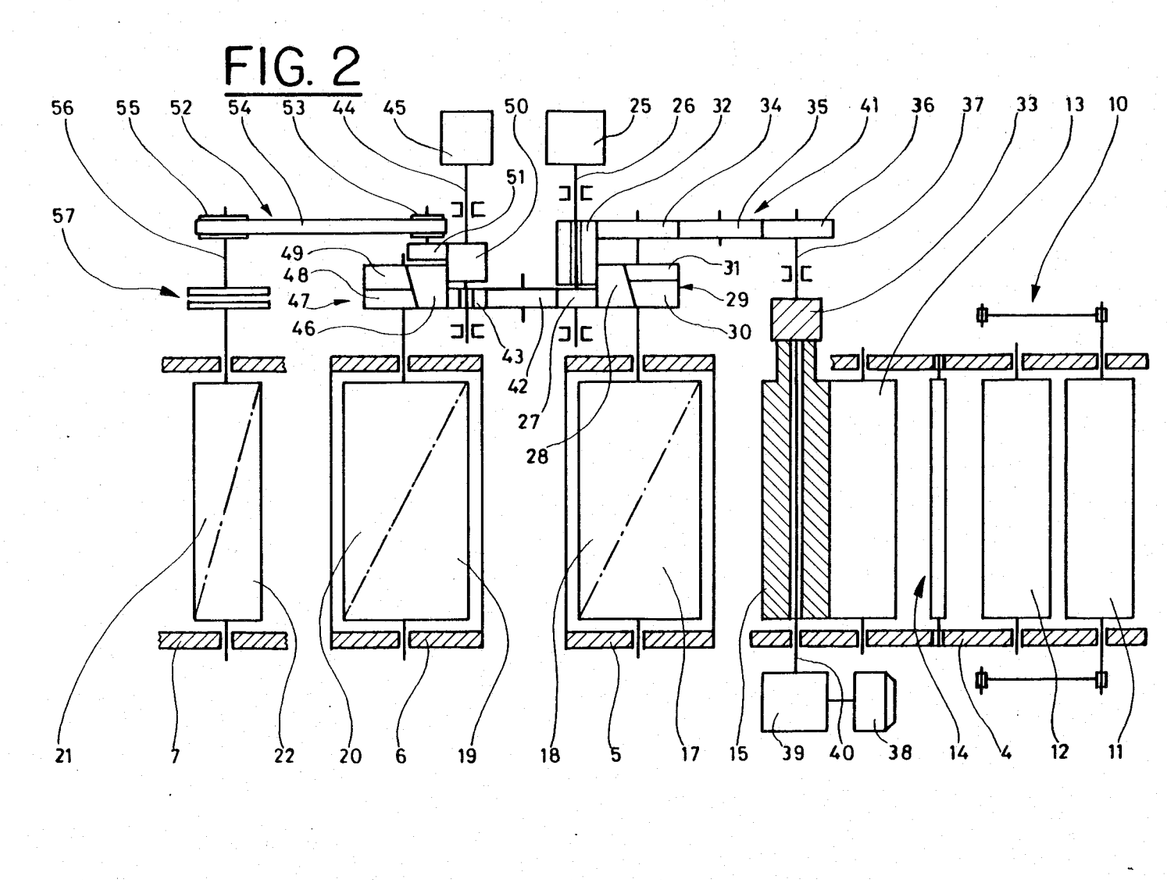
FIG. 2 is a schematic diagram illustrating the drive means for the machine of the present invention.

In addition to these stations 4, 5, 6 and 7, the device has drive means which are best illustrated schematically in FIG. 2. As illustrated, all of the movement of the all of the rotating parts is accomplished by a single drive motor 25 which is a DC motor. The motor 25 has an output shaft 26 which is connected with a drive pinion 27 which is in meshing relationship with a tooth gear 28 on the axle of the lower rotating cutting tool 17. The gear 28 also is in direct driving relationship with a play compensating device 29 which is mounted on the axle of the upper rotatable tool 18. The compensation device 29 is composed of two gears 30 and 31 with a variable angular position with regard to each other. They are tightened together with a locking screw (not illustrated) and this two gear assembly is well known in the art.

The gear 28 is also in meshing relationship with a wide pinion 32 which is mounted for free rotation on the shaft 26. The wide pinion 32 is part of a first gear train 41 for transferring the rotation to an input axle 37 of a differential 33 which rotates the feed cylinder or roll 15. The gear train 41 includes a gear 34, an intermediate gear 35 and a driven gear 36 which is secured on the input axle 37. As mentioned hereinabove, the feed cylinder or roll 15 feeds the given quantity of web corresponding to the exact length needed for processing of the desired box blank and therefore its circumferential speed is to be set according to the size or necessary length with corrections for registration. To that aim, a correcting motor 38 coupled with a reducer 39 has an output axle 40 which is also connected to the differential 33 so that the rotation of the feed roll 15 will be the sum of the input on the axles 40 and 37. In addition, it is necessay to compensate for the play of the various gear trains in order to secure an accurate function of the members acting on the web material. To this aim, the above-mentioned assembly always keeps the force of the gear teeth in the same direction and thus insures that the play between the teeth has no influence on the accuracy of the registration. This is achieved as the tensioning forces acting on the feed cylinder 15 tend to be opposed to the driving forces given by the wide pinion 32 through the gear train 41 and the differential 33.

The driving of the lower rotatable tool or roll 19 of the second cutting and/or creasing station 6 is started at the drive pinion 27 by means of an intermediate gear 42 engaging a drive pinion 43 which can rotate around a shaft 44 of a braking member 45. The pinion 43 engages a drive gear 46 mounted on the axle of the lower rotatable tool or roll 19. A play compensation between the teeth of the driving gears of the lower and upper tools 19 and 20 is achieved with a play compensating device 47 made of two gears 48 and 49, whose angular position can be varied as mentioned hereinabove with regard to the device 29. The gear 46 also engages a wide pinion 50, which is keyed to the shaft 44 of the braking member 45. Thus, a counterforce suppressing the play in the gear and constantly keeping the forces of the teeth acting in the same direction is created as already done with the control of the lower and upper tools 17 and 18 of the cutting and creasing station 5.

The driving of the lower and upper stripping tools 21 and 22 of the stripping station 7 is carried out by a gear 51 engaging the wide pinion 50 and by means of a third drive train 52 of a chain or tooth belt. The drive train 52 includes a driven tooth pulley 53 connected by a tooth belt 54 to a driven tooth pulley 55 keyed on a driven shaft 56 of the lower tool or stripping roll 21. The driven shaft 56 is provided with an angular phase device 57 for the setting of the angular position of the lower and upper stripping tools 21 and 22. Such a device is described in greater detail hereinafter in connection with FIG. 7. It is to be noted that the stations 5 and 6 are provided with a similar device mounted therebetween and preferably part of the second drive train.

Figure 3:
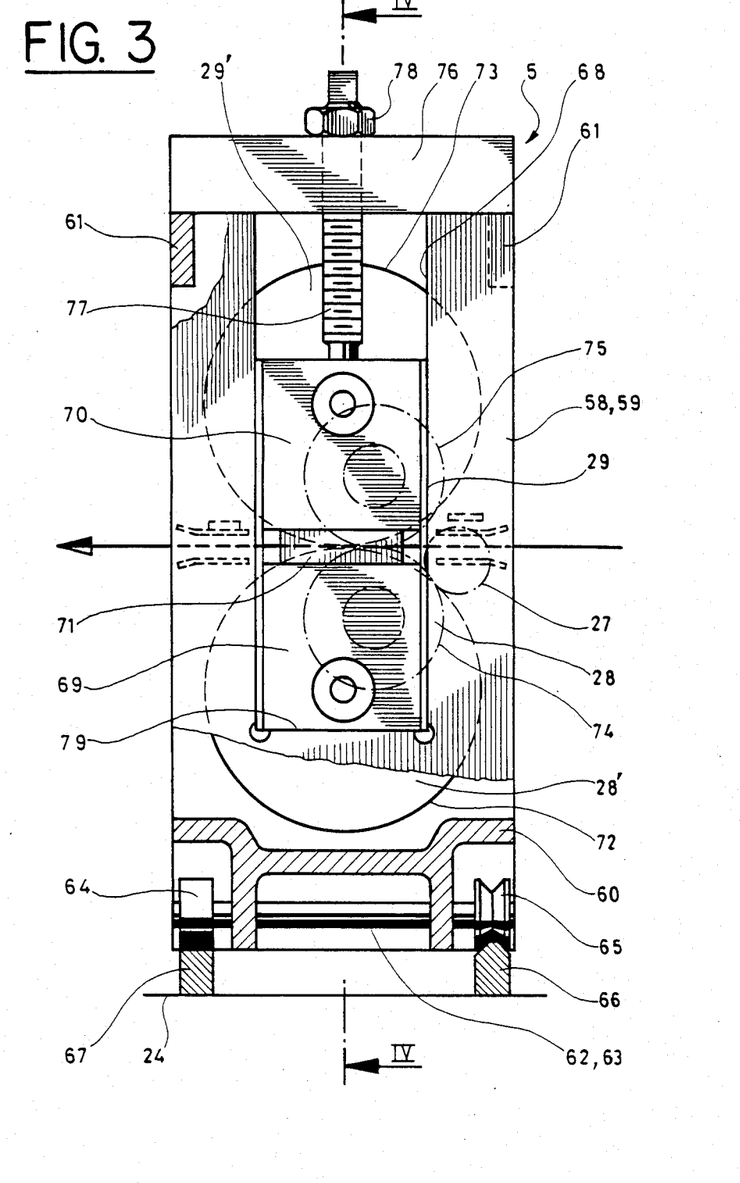
FIG. 3 is an end view with portions broken away of a frame for one of the stations having a pair of rotatable tools.

Each of the groups or stations with rotatable tools such as the stations 5, 6 and 7 have a similarly constructed frame for mounting the rotatable tools. In FIG. 3, a frame for the cutting and creasing station 5 is illustrated. The frame comprises two side or lateral frame members 58 and 59 which are connected with cross-bars such as 60 and 61. The cross-bar 60 is arranged so that it receives or mounts two shafts 62 and 63. Each of the shafts 62 and 63 at one end is provided with flat rollers 64 which is engaged on a flat bar 67 and at the opposite end is provided with a groove roller 65 which is received on a profile rail 66. Thus, the frame can be moved or adjustably positioned on the base 24 in a direction extending perpendicular to the plane of the Figure and parallel to the axles of the tools.

Each of the lateral frame members 58 and 59 has a slot or groove 68 for receiving the lower and upper bearing blocks 69 and 70. To insure the desired gap between the two bearing blocks 69 and 70, a thickness shim or plate 71 is arranged between the blocks 69 and 70 and allows for setting the play between the teeth of the gears 28 and 29 which are mounted on the axles of the tools. The outer dimensions of each of the bearing blocks 69 and 70 is the same; however, the position of the bearing will change depending on the diameter of the rotatable tool and gear. As illustrated, circles 72 and 73 represent the largest possible diameter for the tools which have the large diameter gears 28' and 29'. In a similar manner, the smallest diameter tools having the small diameter gears 28 and 29 are represented by the circles 74 and 75. It should be noted that the gears 28 and 29 or 28' and 29' each have an initial diameter which is equivalent to the theoretical diameter of their respective roll or rotatable tools 17 and 18. It also has to be noted that the position of the driving pinion 27 is the same regardless of which size tool is being utilized and that to obtain a meshing relationship with the drive pinion 27, the position of the axle for the gear 28 is moved relative to the position of the axle for the gear 28'.

It is desirable to provide locking means for urging the bearing blocks 69 and 70 downwardly with the bearing block 69 tightly engaging a lower face or end of the slot 68. As illustrated, the locking means comprise a cross-bar 79 extending across the slot 68 which has a threaded bore for receiving a tightening screw 77 which is provided with a counter-nut 78.

Figure 4A:
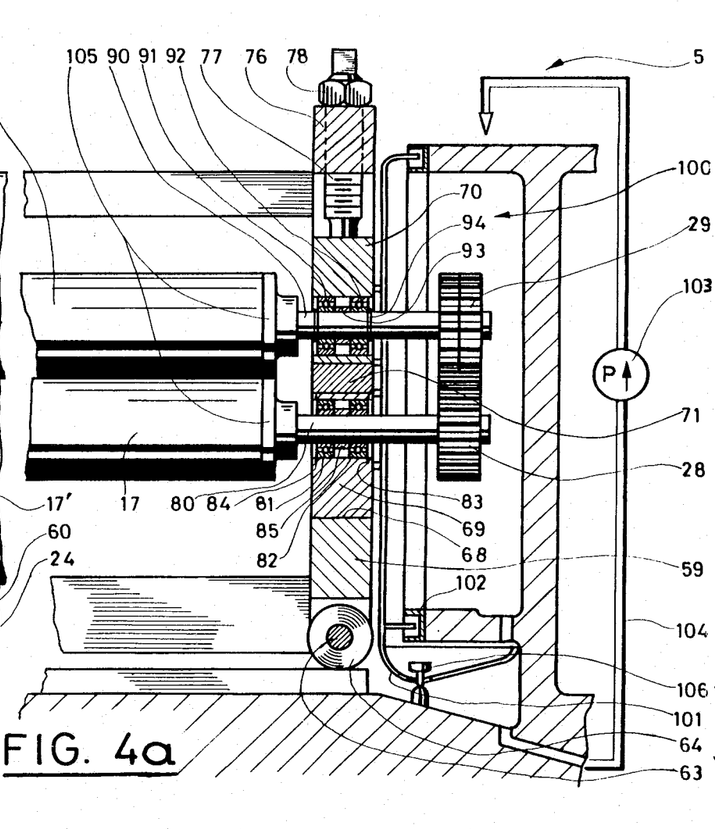
FIG. 4a is a partial cross-sectional view taken along lines IV—IV illustrating a right end of the frame having a pair of small diameter rotatable tools.
Figure 4B:
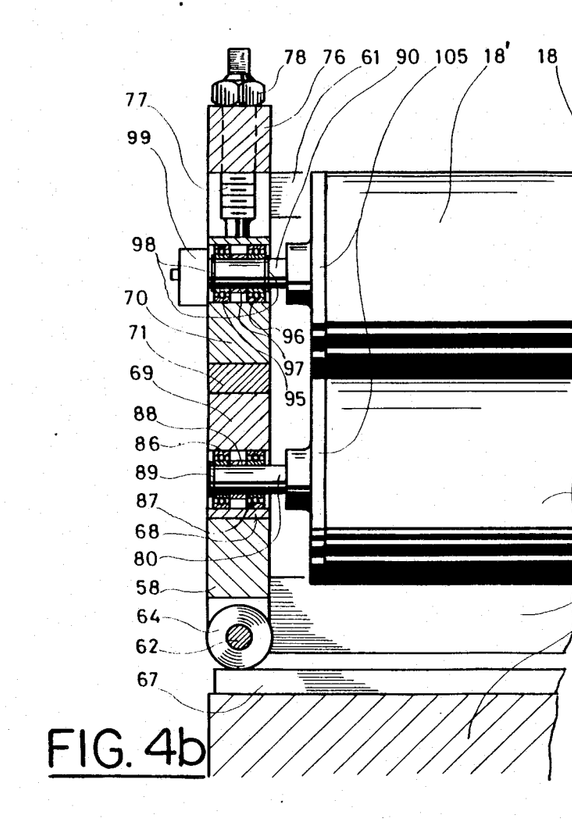
FIG. 4b is a partial cross-sectional view taken along lines IV—IV illustrating the other end of the frame with a large diameter rotatable tool mounted in the frame.

FIGS. 4a and 4b show the arrangement of the rotatable tools of different size with FIG. 4a being a right-hand view with small diameter tools 17 and 18 and FIG. 4b being a left-hand view with large diameter tools 17' and 18'. Each of the lower tools or rolls 17 or 17' has a shaft 80. The right-hand end of the shaft 80 is supported in a bore of a bearing block 69 by a pair of ball bearings 81 and 82 which are held in the bearing block by axial stops 83 and 84 with a sleeve member or spacer 85. The other end of the shaft 80 as illustrated in 4b is mounted for rotation in the lower bearing block on the left-hand side by ball bearings 86 and 87 separated by a bushing or spacing 88 and this shaft is prevented from coming out of the bearings by a stop 89. The upper rotative tool or roller 18 or 18' has a shaft 90. The right-hand end of the shaft as illustrated in FIG. 4a is supported by ball bearings 91 and 92 which are held in a bore in the bearing block 70 with the desired spacing by a bushing 93 and by a pair of axial stops 94. At the other end, the shaft 90 is mounted in the bearing block 70 by a pair of ball bearings 95 and 96 spaced apart by a spacer or bushing 97 and held by locks such as 98. On the free end of the shaft 90, an axial setting 99 of the upper rotatable tool is envisioned in order to set the axial position of the upper rotatable tool with regard to the lower rotatable tool. It is to be noted that the direction of the lateral registry of the cutting operation can occur by shifting sidewise the whole assembly with means such as, for instance, a micrometric screw acting on the sidewise shifting of each of the groups or stations 5, 6 and 7. To provide sufficient lubrication of the controlling gears such as 28, 29, a gear casing 100 which has a cover 101 engaged in a slideway 102 of the side of the base 24 is provided. A recirculating pump 103 is arranged on a return oil circuit 104. Each upper and lower tool, as illustrated, is provided at the end with a rolling path 105 to insure that an adequate gap between the operating surfaces of the two rolls is obtained. The cover 101 has on its lower part a security plug 106 which is also opened when the rotatable tools 17 and 18 are positioned between the side frames 58 and 59.

Figure 5:
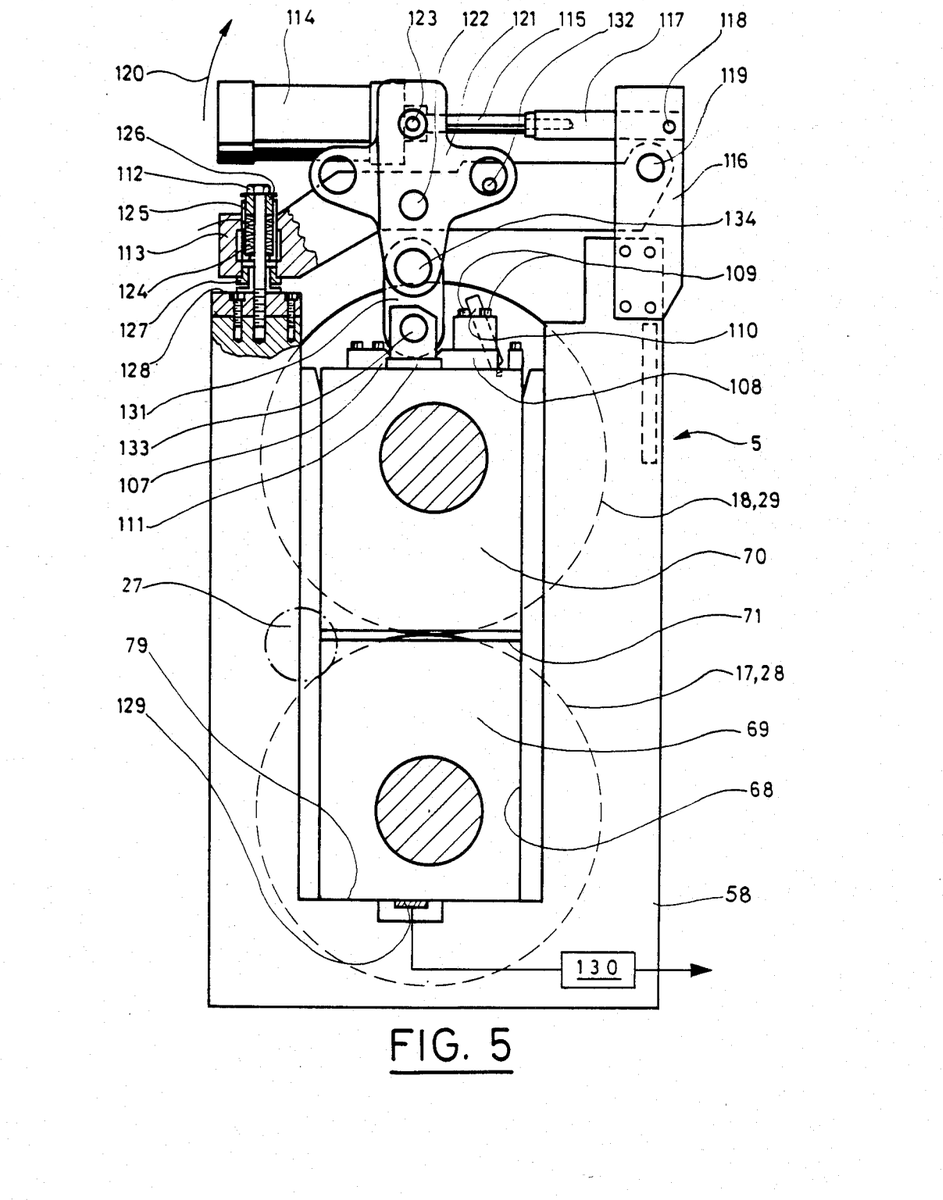
FIG. 5 is an end view of the frame assembly of FIG. 3, with portions broken away for purposes of illustration, illustrating a jam-preventing means for the station.

In order to prevent damage to either the upper or lower tools 17 or 18 when an overload occurs, a jam-preventing means or device is provided in the locking means and acts on the upper bearing block 70. As best illustrated in FIG. 5, the jam-preventing device also facilitates the removal or dismounting of the upper and lower bearing blocks, for instance, during a change of the roll sizes. Each upper bearing block 70 is provided on its upper face with a fixing member made of a fixed stop 107 and a shiftable counterpiece 108 which after the unlocking of screws 109 can be shifted with a handle 110 to set a fixing piece 111 free when the bearing block has to be removed. The jam-preventing device has to be lifted for dismounting the bearing block. As the fixing piece 111 is set free, a screw 112, which secures one end of a lever 113 is removed. The other end of the lever 113 is pivotally connected by an axle or a pin 119 to a member 116 which is mounted on one of the frame member 59. A pneumatic piston or jack 114 has a piston rod 115 connected to a plate or member 117 which is pivotally mounted on the member 116 by a pin or axle 118. In addition, a cylinder of the jack 114 is pivotally connected by a pin 123 to a member 121, which is also pivotally connected to the lever 113 by an axle or pin 122. After releasing the screw 112, the lever 113 is moved to unblock the groove 68 by actuating the jack which causes the jack and arm to swing in an arc indicated by the arrow 120. This movement is continued until the lever is clear of the opening of the groove or slot 68.

The member 121 is also pivotally connected by a pin 134 to a link 131 which is pivotally connected by a pin 133 to the fixing piece 111. The jam-preventing device facilitates the change of the bearing blocks. When the tools supported by the bearing blocks 69 and 70 are positioned and operating, the jam-preventing device is positioned as shown in FIG. 5. The bearing block 69 supports the lower rotative tool or roll 17 engaged in the groove 68 and receives a thickness shim calculated to give the precise requested fit between the two rotating rolls 17 and 18. When the upper bearing block 70 supporting the upper rotative tool or roll 18 is positioned and coupled with the fixing member to the jam-preventing device by means of the fixing piece 111. The screw 112 is then tightened until it applies with the spring washers 124 an operating force calculated with regard to the cutting force existing between the rotative tools. This operation is facilitated by providing a bushing 125 with numerical marks corresponding to the values for the calibration of the force required to deflect the spring washers and by measuring the deflection between the bushing 125 and the core 126. As soon as the value of deflection "f" is obtained, the counter-nut 127 will be tightened against a face 128 of the frame member for the station 5. The rotative tools or rollers 17 and 18 are ready for operation. An overload detector 129, for instance, made as a strain gauge, is set for a zero value. As soon as a given increase of a load occurs, because of the wear of the tools, for instance, the overload detector 128, will provide an increased signal level which is sent to a converting member 130 which controls the emission of air into and out of the pneumatic jack 114 in response to a certain signal level. The jack carries out a pivoting of the member 121 around the axle 122 until a stop pin 132 provided on the lever 133 engages a side or edge of an aperture to stop this movement. As the fix rod 111 has been connected through the link 131 and axles or pins 133 and 134 to the member 121, it will cause the upper bearing block to be raised relative to the lower bearing block so that the working pressure created by the spring washers 124 is decreased and no damage of the rotatable tool or rolls such as 17 and 18 can occur. It is to be noted that this vertical shifting of the bearing block 70 does not disengage the drive gears 27, 28 and 29 so that the registration of the angular position of the tool is maintained. Moreover, as soon as the overload is detected, the converting member 130 sends a signal to create an emergency stop of the machine.

Figure 6:
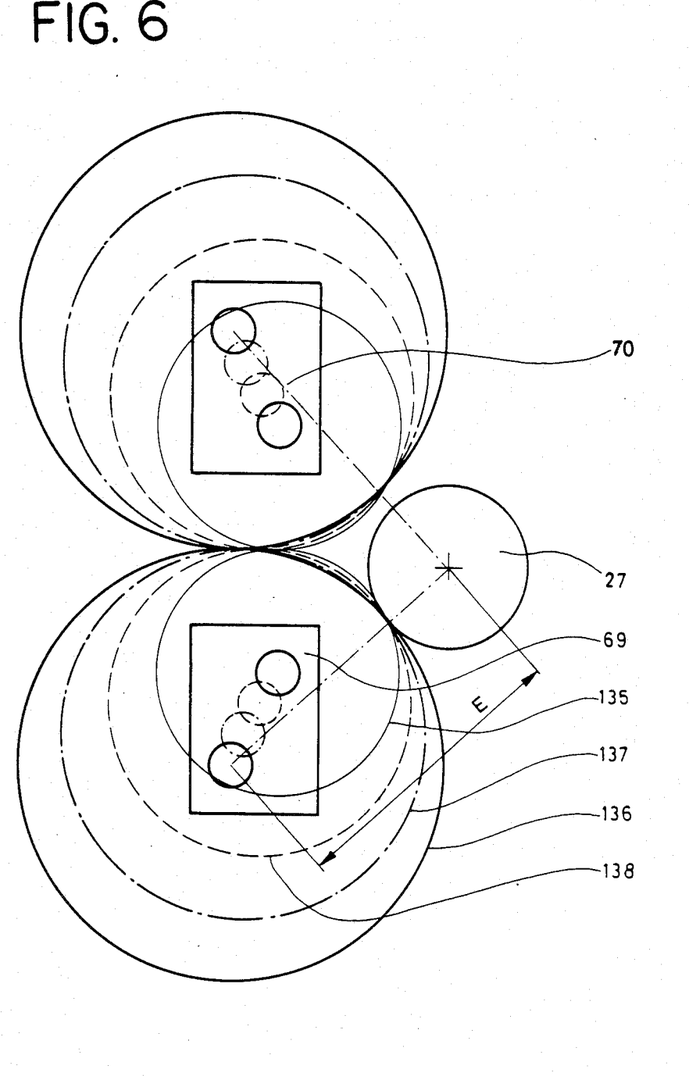
FIG. 6 is a diagrammatic illustration showing the relationship of the pair of bearing blocks, and a drive pinion for rotatable tools having different diameter rolls.

As mentioned hereinabove, bearing blocks having the same configuration such as the bearing blocks 69 and 70 are used for mounting the rotative tools or rollers having different diameters. This arrangement is schematically illustrated for various rotative tools of different diameters with the minimum diameter being indicated by circle 135 and a maximum diameter being indicated by circle 136 and two intermediate diameters being indicated by circles 137 and 138. The theoretical diameter Dth of the rotative tools are calculated with regard to the forward shifting of the web material A between these tools with the following equation:

$$Dth = A/\pi \cdot k$$

wherein k is a possible correction factor provided for the tool manufacturing mode. This theoretical diameter Dth is comparable to the operating diameter of the tooth gears which are associated with the particular tool. Whatever the diameter of the tool can be, the teeth of the drive gears are machined according to the same pattern and the calculation of the primary diameter depend upon the theoretical diameter Dth and the chosen pattern. Thus, the location of the drive pinion 27 remains the same for the different diameters of the operating tool. The axle of the drive pinion 27 always remains the reference to calculate the position for the bearings of the axles of the rotative tools. The lateral position of the axle of the tool can thus always be calculated with regard to the distance E between the axle of the gears such as 28 (FIG. 3) corresponding to one or the other of the theoretical diameters Dth of the tools. This calculation also indicates the vertical position and lateral position of the axle of the lower gear and as the theoretical diameter Dth are the same for the lower and upper rotative tools, the upper and lowering bearing blocks are manufactured with the same data. This allows the use of the same bearing block drawings for both the upper and lower parts with a precise and simultaneous tooling of the upper and lower bearing blocks for a set of rotatable tools having a given theoretical diameter Dth. It is noted from FIG. 6 that the bearing or aperture of the bore receiving the axle of the rotatable tool not only shifts in the bearing block in a vertical direction but also in a horizontal direction to obtain the desired position of the axle relative to the axle of the drive pinion 27.

Figure 7:
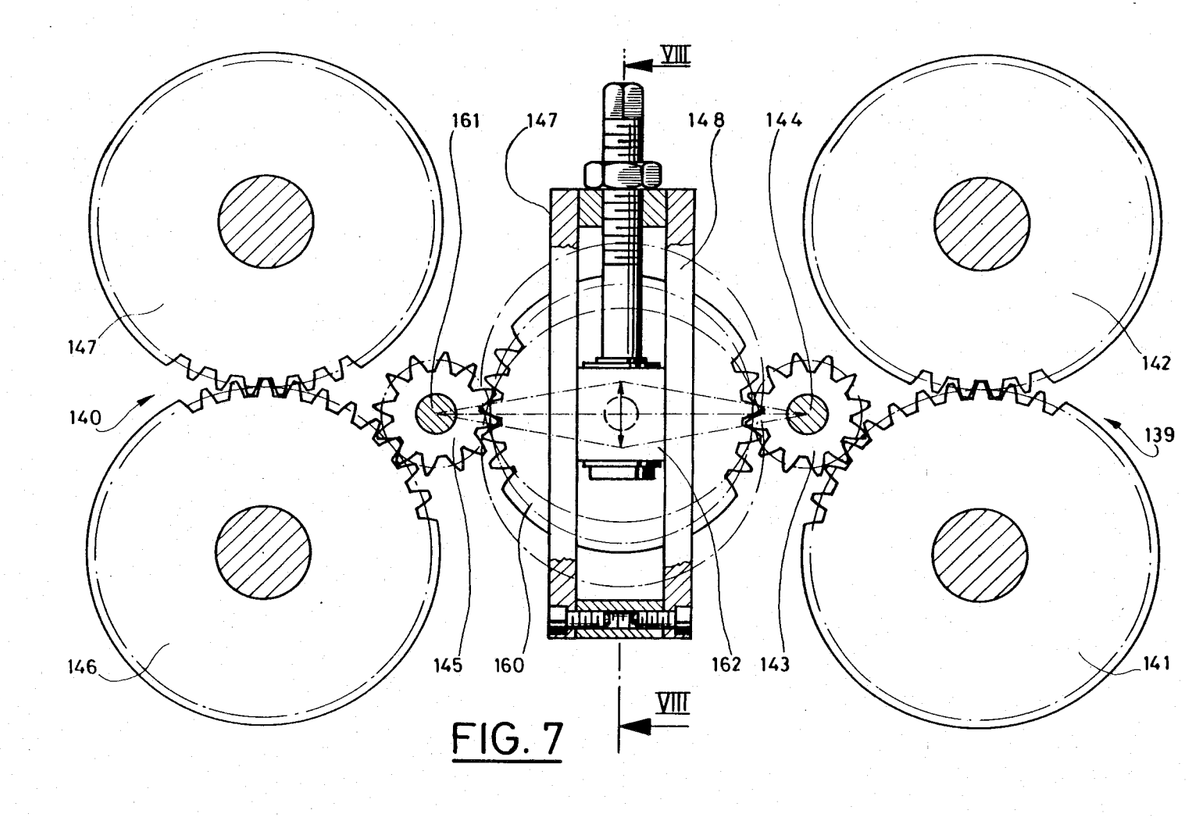
FIG. 7 is an end view illustrating the phasing device in accordance with the present invention.

A phase-correcting device for two groups of rotatable tools 139 and 140 is illustrated in FIG. 7. The rotative tools of the group 139 are supposed to be in phase with regard to one another and the driving is accomplished by the lower gear 141 to the upper gear 142. A pinion 143 is engaged with the lower gear 141 and consequently rotates around an axle 144. The rotative tool of the group 140 are also to be in phase with regard to each other but their angular phasing with regard to the rotative tools of the groups 139 is not necessarily set. The rotation is communicated from the first group of the rotative tools 139 to the second group 140 by means of the pinion 143 mounted on the axle 144 engaging with an intermediate gear 160. Another pinion 145 which is mounted for rotation on an axle 161 is engaged with gear 160 and also a gear 146 of the lower tool in the group 140. The gear 146 is in driving engagement with the gear 147. The intermediate gear 160 can rotate on a bearing of a member 162 which is mounted on a shaft of a screw 147 which is threadably received in a cradle 148 which may be secured on the frame (not shown) connecting the two groups 139 and 140. As the pinion 143 is a drive pinion, the vertical shifting of the intermediate gear 160 will change the angular position of the driven pinion 145 and change the angular position of the tooth wheel 146 as well. This also allows an angular phasing of the second group of rotative tools 140 with regard to the first group 139 according to the value of the vertical shifting of the axle of the intermediate gear 160.

Figure 8:
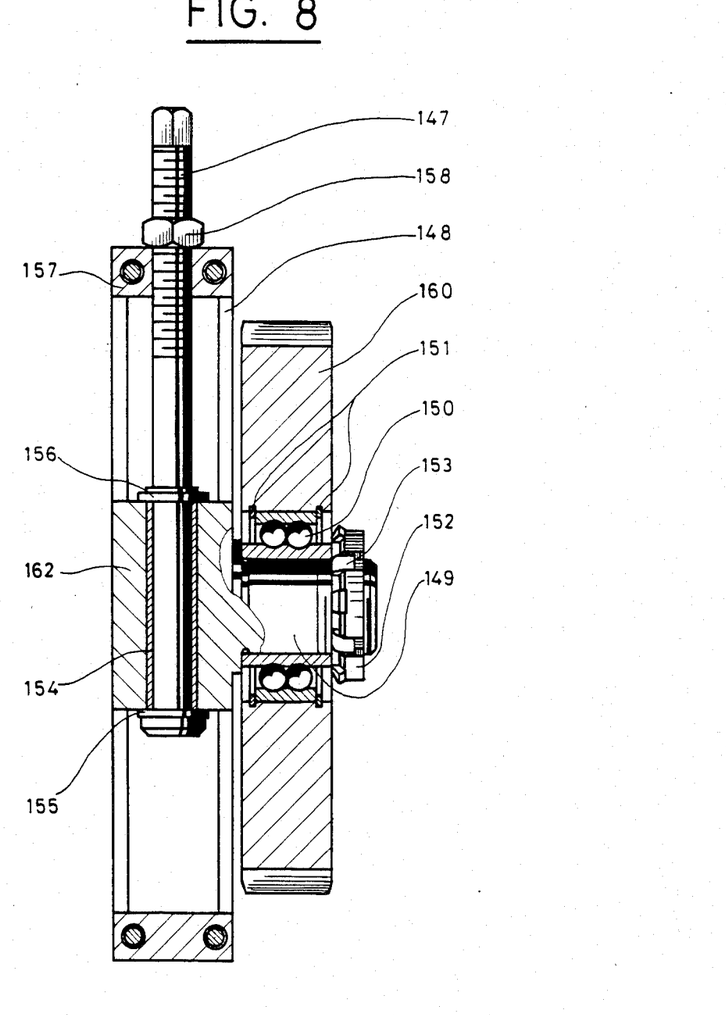
FIG. 8 is a cross-sectional view with portions in elevation taken along lines VIII—VIII of FIG. 7.

As best illustrated in FIG. 8, the member 162 has a stud 149 which supports a ball-bearing 150 which is mounted in the hub of the intermediate gear 160 with stop rings 151. A nut 152 is locked by a stop ring 153 and is tightened on the side of the inner race of the bearing 150. At the lower end, the screw 147 is received in a bushing 154 in the member 162 and is held therein by stop rings 155 and 156. Adjacent the upper end, the setting screw 147 is threadably received in a cross-piece 157 of the cradle 148 which acts as a slide for the member 162. A counter-nut 158 can lock the position of the intermediate wheel or gear 160. It is to be noted that the screw 147 could be rotated by a motor in response to a signal from a detection device to constantly change the angular variation between the first and second groups of rotating tools 139 and 140. A manual setting of the screw 147 is also possible as described hereinabove.

The arrangement of the gears 143, 160 and 145 can replace the gears 43, 42 and 27 of FIG. 2 to provide angular phase compensation between the tools of stations 5 and 6.

The main advantage of the system for processing web material essentially lies in the design which allows the use of standard bearings blocks for various sizes of rotating tools and that the user can easily set the position between the successive working stations. In addition, the user can be sure that no damage can occur to the working tools in case of a jam. In addition, changing of the tools can occur with less downtime of the machine.

Although various minor modifications may be suggested by those versed in the art, it should be understood that I wish to embody within the scope of the patent granted hereon, all such modifications as reasonably and properly come within the scope of my contribution to the art.

I claim:

1. In a machine for processing web material comprising a feeding station, a creasing station provided with rotatable tools, a cutting station with rotatable tools, a stripping station with rotatable tools, a delivery station and drive means for rotating the rotatable tools, the improvements comprising each of the stations with rotatable tools including a frame having two lateral frame members, each lateral frame member having a groove, a drive pinion of the drive means being mounted on one of the two lateral frame members adjacent the groove, each of said grooves receiving a lower bearing block and an upper bearing block separated by a thickness plate, said upper and lower bearing blocks mounting upper and lower rotatable tools with one of the tools having a pinion in driven engagement with the drive pinion of the station, said bearing blocks having identical outside shapes regardless of the size of the rotatable tool, locking means being provided on each of the frame members for providing a locking pressure to urge the upper and lower bearing blocks downwardly with the lower bearing block engaging the lower face of the groove, said locking means including jam-preventing means for releasing the locking pressure on the bearing blocks in response to a predetermined pressure being applied to the rotatable tools; and said drive means having a single drive motor directly connected through a shaft to the drive pinion of one of said stations with rotatable tools, said drive pinion being connected by a first drive train to a differential means having an output connected to a feed roll of the feed station, said differential means receiving an input from a correction motor for varying the rate of feed of the web to the stations having rotatable tools, said drive pinion being connected by a second drive train to the drive pinion of an adjacent station having rotatable tools, said second drive train including an angular phase means for setting the phase between stations, said adjacent station having braking means connected to a pinion acting on the gears of its rotatable tools and a third drive train connecting the second station to the stripping station, said stripping station having an angular phase means for setting the phase between its upper and lower tools.

2. In a machine according to claim 1, wherein the angular phase means of the second drive train includes an intermediate gear being in constant engagement with the drive pinion of said one of said stations and the drive pinion of the adjacent station, said intermediate gear being mounted for rotation by a bearing on a member slidably received in a cradle having means for moving the position of said member so that the position of the axis of the intermediate gear relative to the axes of the two drive pinions can be changed to change the angular phase between said drive pinions.

3. In a machine according to claim 1, wherein the jam-preventing means include a lever having one end pivotally mounted on the lateral frame member with the lever extending across an opening of the groove receiving the bearing blocks, the other end of said lever being held by pressure-applying means for providing a desired locking pressure, a first member pivotally connected to said lever and to a pneumatic jack, said pneumatic jack having a piston rod being pivotally connected to the lateral frame member adjacent the pivotal connection of said lever, overload detector means being mounted adjacent the lower face of the groove and actuating movement of the pneumatic jack to pivot said lever against said pressure-applying means in response to a detected overload.

4. In a machine according to claim 3, wherein the overload detector means includes a strain gauge, and means receiving the output of the strain gauge and creating a signal when a predetermined output from the gauge is received.

5. In a machine according to claim 3, wherein the first member and lever have coacting means to limit the amount of movement to relieve the locking pressure, said means comprising a stop on the lever engaged in an aperture in said first member.

6. In a machine according to claim 1, wherein each of the drive pinions for the rotatable members engage a gear on the lowermost rotatable member of the station, said upper rotatable tool having a gear provided with play compensating means engaged with the lower gear.

7. In a machine according to claim 1, wherein the first drive train includes a wide pinion rotatably received on the shaft of the motor, said wide pinion being engaged with the gear of the lower rotatable tool of the first station, a gear train extending from said wide pinion to said differential means.

8. In a machine according to claim 1, wherein the third drive train includes a set of chains extending between sprocket gears for transferring rotation from the adjacent station to the stripper station.

* * * * *